VAN BROADUS DALTON.
DENTAL MODEL.
APPLICATION FILED JUNE 6, 1913.

1,102,390.

Patented July 7, 1914.

Witnesses
Harry J. Gill.
Thos. C. Pindington.

Inventor
Van Broadus Dalton
by John W. Strehli
Attorney

UNITED STATES PATENT OFFICE.

VAN BROADUS DALTON, OF CINCINNATI, OHIO.

DENTAL MODEL.

1,102,390. Specification of Letters Patent. Patented July 7, 1914.

Application filed June 6, 1913. Serial No. 772,208.

*To all whom it may concern:*

Be it known that I, VAN BROADUS DALTON, a citizen of the United States, and a resident of the city of Cincinnati, in the county of Hamilton and State of Ohio, have invented certain new and useful Improvements in Dental Models, of which the following is a specification.

In the teaching of orthodontia, which treats with that part of dentistry relating to the placing of irregular, crooked and malposed teeth into the position they should naturally occupy in the jaw, it is necessary and customary to use models made of plaster of Paris, which models simulate sets of malposed teeth. The malposed teeth are forced to normal position by the varied use of the expansion arch held in position by metal bands clamped or cemented to the teeth. It is necessary in teaching this part of the dental art to use these models, as it is impossible to teach all details from the natural teeth or from illustrations.

In using plaster of Paris models, the difficulty in making bands, owing to the softness, brittleness and tendency to give and yield when the metal bands are clamped thereon, either gives the student the wrong impression, or he will change the model to fit the bands he has prepared, thus slighting the work and giving him the wrong idea with regard to making the appliances. One of the evils resulting from this method is, for example: that when the student is allowed to work on a natural tooth or as a practitioner is fitting a tooth with a band he sometimes takes the measurement of the tooth instead of clamping the band directly on said tooth; such a band fits improperly and often occasions injury to the tooth, and disturbing and annoying the patient from the loosening of the band. This method also entails more work upon the teacher.

I overcome all these defects by producing a dental model for teaching orthodontia, which is made of a hard substance, which will not yield, crack or break off in the formation of bands, thus giving the student a correct idea and naturally forcing him to practically demonstrate the mounting of appliances; also enabling the teacher to more readily and satisfactorily teach the student.

My dental model may be made of hard rubber, pulp, vulcanite, fiber, or any other analogous and desirable material. I may make the model for the upper or lower jaw and teeth. I may make upper and lower jaw models and equip them with bands to illustrate the intermaxillary appliances.

Figure 1:
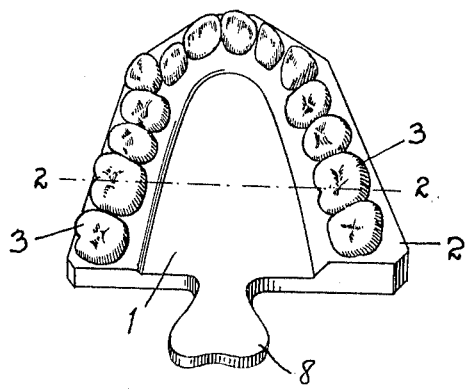
Figure 2:
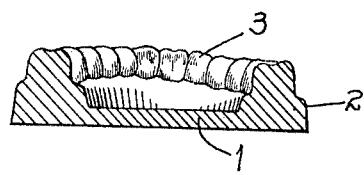
Figure 5:
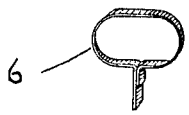
Figure 4:
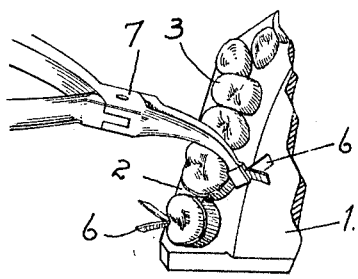
Figure 3:
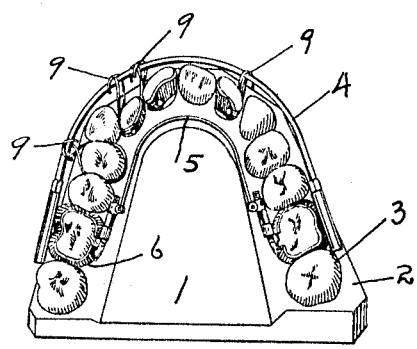

In the accompanying drawing forming part of this specification, Figure 1 is a plan view of my dental model without expansion arches or bands thereon; Fig. 2 is a section on line 2—2 of Fig. 1; Fig. 3 is a plan view of the dental model with the expansion arch and bands clamped thereon; Fig. 4 is a fragmentary view of the dental model showing part of the band forming pliers, showing the manner of making a band, same as is done in the mouth, and Fig. 5 is a plan view of one of the bands after formation on the model and removed from the model ready to be soldered.

The body of the dental model is marked 1, the process or bony surroundings of the teeth is marked 2, and 3 represents the teeth. The body, process and teeth may be made up any shape or contour desired, as various formed irregularities in teeth come under treatment of the orthodontist. The expansion arch is marked 4, and the auxiliary arch 5, and the bands 6; the band forming pliers being marked 7. The wires 9 are used to rotate the teeth. If desired I may place a handle as 8 on the body 1, but it is not necessary to do so.

It will be readily understood from the foregoing description that my models will facilitate the teacher in pointing out the procedure of making and adapting appliances and further, the student is correctly taught to form the bands and appliances the same as in the mouth, and he cannot make mistakes or shirk the work or receive false impressions, as the model remains the same at all times and does not yield nor break nor chip off, nor is it susceptible of being altered without being noticed by the teacher.

What I claim as new and my invention and desire to secure by Letters Patent is:—

1. A dental model made from a hard, tough substance to simulate a series of malposed teeth from which to teach orthodontia.

2. In a dental model, a base, process and teeth formed integral, the whole formed from a tough hard substance, the teeth made irregular and malposed, to simulate a series of natural malposed teeth, to teach orthodontia.

VAN BROADUS DALTON.

Witnesses:
HARRY J. GILL,
JOHN W. STREHLI.

Copies of this patent may be obtained for five cents each, by addressing the "Commissioner of Patents, Washington, D. C."